(12) United States Patent
Belousov et al.

(10) Patent No.: US 6,328,342 B1
(45) Date of Patent: Dec. 11, 2001

(54) TAPE DATA CARRIER, METHOD AND DEVICE FOR MANUFACTURING THE SAME

(76) Inventors: Boris Ilich Belousov; Anton Borisovich Belousov, both of 127490, ul. Musorgskogo, d.11, kv. 91, Moscow; Mikhail Julianovich Kondratenko, 143980, ul. Jubileinay, d.6, kv. 30, g. Zheleznodorozhny, Moskovskoi oblasti; Svyatoslav Eliseevich Kim, 660000, ul. Matrosova, d. 28, kv. 301, Krasnoyarsk, all of (RU)

(*) Notice: Subject to any disclaimer, the term of this patent is extended or adjusted under 35 U.S.C. 154(b) by 0 days.

(21) Appl. No.: 09/011,009
(22) PCT Filed: Mar. 27, 1996
(86) PCT No.: PCT/RU96/00070
§ 371 Date: Feb. 2, 1998
§ 102(e) Date: Feb. 2, 1998
(87) PCT Pub. No.: WO97/05580
PCT Pub. Date: Feb. 13, 1997

(30) Foreign Application Priority Data

| Aug. 1, 1995 | (RU) | 95113787 |
| Oct. 31, 1995 | (RU) | 95117976 |

(51) Int. Cl.$^7$ .................................................. B42D 15/00
(52) U.S. Cl. ............................. 283/91; 283/93; 283/95; 428/173
(58) Field of Search ..................... 283/72, 82, 83, 283/91, 93, 95, 100, 105, 107; 360/2; 235/493; 427/554; 428/173, 137; 250/492.21, 492.3

(56) References Cited

U.S. PATENT DOCUMENTS

| 2,547,838 | * 4/1951 | Russell ............... 236/61.12 |
| 3,567,941 | 3/1971 | Russell . |
| 3,818,226 | 6/1974 | Strindehag . |

(List continued on next page.)

FOREIGN PATENT DOCUMENTS

| 1 704 680 | 3/1972 | (DE) . |
| 36 28 353 A1 | 2/1988 | (DE) . |
| 39 06 695 A1 | 9/1989 | (DE) . |
| 0 155 982 B1 | 9/1985 | (EP) . |
| 2 132 045 | 11/1972 | (FR) . |
| 2 155 001 | 5/1973 | (FR) . |
| 2 177 768 | 11/1973 | (FR) . |

(List continued on next page.)

Primary Examiner—Willmon Fridie, Jr.
(74) Attorney, Agent, or Firm—Knobbe, Martens, Olson & Bear, LLP

(57) ABSTRACT

A tape data carrier for protecting articles and documents from counterfeiting and copying is formed by a polymer structure including at least one polymer layer of which at least one layer has at least one of through-perforations and pits. These through-perforations and pits are preferably between 0.001 $\mu$m and 20 $\mu$m in size and can be filled with different materials. The data carriers can carry concealed and visible macro-and micro- images created by heavy-ion bombardment of the polymer film, subsequent exposure of the bombarded film to ultraviolet radiation, and etching of the polymer film in a solvent. A device for manufacturing a data carrier of this type includes the following elements configured in series: a heavy ion source; a heavy ion beam-formation system; an ion guide; a three-dimensional amplitude modulation unit; and a target which is destined to become the data carrier. The three-dimensional amplitude modulation unit is designed to hold a matrix of wafers and is connected to a drive for rotating and translating the wafers. The drive is connected via a control unit to the three-dimensional amplitude modulation unit for positioning the target.

66 Claims, 9 Drawing Sheets

U.S. PATENT DOCUMENTS

| | | | |
|---|---|---|---|
| 4,393,110 | * | 7/1983 | Fukuda ................................. 428/173 |
| 4,519,632 | * | 5/1985 | Parkinson et al. ..................... 283/75 |
| 5,178,722 | | 1/1993 | Hoshino . |
| 5,186,787 | | 2/1993 | Phillips et al. . |
| 5,204,160 | * | 4/1993 | Rouser ................................. 428/167 |
| 5,351,142 | * | 9/1994 | Cueli ....................................... 359/2 |
| 5,795,643 | * | 8/1998 | Steininger et al. .................. 428/143 |
| 5,858,623 | * | 1/1999 | Yu et al. .............................. 430/315 |
| 6,031,240 | * | 2/2000 | Kodama ......................... 250/492.21 |
| 6,043,499 | * | 3/2000 | Seki et al. ....................... 250/492.21 |

FOREIGN PATENT DOCUMENTS

| | | |
|---|---|---|
| 2 455 773 | 11/1980 | (FR) . |
| 2 092 952 A | 8/1982 | (GB) . |
| 574044 A1 | 2/1991 | (RU) . |
| WO 89/00319 | 1/1989 | (WO) . |
| WO 90/08367 | 7/1990 | (WO) . |

\* cited by examiner

TAPE DATA CARRIER, METHOD AND DEVICE FOR MANUFACTURING THE SAME

FIELD OF THE INVENTION

This invention relates to means for storing information, to methods for creating protective film elements intended to protect valuable documents and other articles from counterfeiting, cleaning, correcting and copying, and also to apparatus for their producing.

DESCRIPTION OF THE RELATED ART

An information carrier in the form of a credit card being a polymer structure which consists of two layers is known V. Belikov. "Electronic money: accumulation, employing, storing, safety"). In this carrier a layer is applied on a polymer structure layer, which has a relief surface and comprises a card owner identification code.

A resolution of modern relief image print types does not exceed 100 mm⁻. Such images defies a direct copying, but it is not too difficult to produce a forgery card having such an image.

An information carrier which is made in the form of a composite material for a stencil print being a polymer structure consisting of two layers is also known (JP, B2 4-67515). One of this carrier's layers is made of a complex polyester or a nylon, and has regularly located recesses equal or greater than 50 $\mu$m (micrometers) in size. Second layer is made of a high-molecular resin.

Said material has a limited resolution that create obstacles for its use in recording and replaying confidential messages.

A maximal progress in the art of recording and replaying high-frequency images is achieved in the field employing holographic and laser methods. These methods find their wide application last 20–30 years.

A method for producing a valuable document, in accordance with which a substrate of a paper or a cardboard is first produced, is know (FR, A1, 76 34289). For providing an optic mark structure causing a diffraction, reflection, or a refraction of falling light, a transparent layer of a layer formed by a printing paint is applied on that substrate, on which layer an information about the validity is written in the form of optic squeeze marks provided by squeezing under a pressure and while heating with a diffraction master lattice or a master hologram.

Also a method for non-repeated indicating articles to prevent their copying or counterfeiting by way of applying a holographic image onto a sheet or a film, introducing this sheet or film into the article or its packing, is known (GB, A1, 2092952). The image may be introduced itself or it may be, for example, a holographic image of an owner or a monarch.

In despite of a high resolution at a current level or a development and spreading of a holographic technology for reproducing and squeezing, it is possible to make a copy with a very accessible means: lasers, holographic stands, moulding devices which are widely produced in various countries. Moreover, with a great number of copies of a valuable papers, it is technically difficult to provide in this number of copes a protection of one paper relative to another within the use of this technology because it doesn't provide an individual protection of a document.

A method for marking documents provided with an individual code in the form of punch which pattern has recognizable irregularities is known. The punch is performed by a laser beam on the basis of a usual pattern, wherein the laser control is performed by a computer in such a way that each punch has an individual irregularity depending on a starting value (DE, A1, 3628353).

By this method it is possible to perform only an issue of a small-numbered article amount since a speed of an every-point laser burning is significantly lower in comparison with techniques for forming marks simultaneously over the whole carrier area. This method has also restrictions on the minimum diameter size of the hole with its maximum depth, which restrictions are connected with a wavelength diffraction limiting of the laser radiation, its power, and a carrier actinism, which is typical for polymer materials.

A method for creating a document protected from the counterfeiting is known, in accordance with which method a reflecting layer is applied onto at least one side of a sheet carrier. Pluralities of grains are applied on the reflecting layer, resulting in that the layer surface has an altering reflectivity (EP, A1, 0155982). Marks formed by pluralities of grains may be read by a machine method.

This highly original method of document protection from counterfeiting has a number of essential limitations in its application. For example, it is difficult to provide a high resolution because of aggregating grains during their grinding and applying, due to rising the image spectrum bandwidth in the lower space frequency area while increasing a dispersity.

Also a method for producing a protective element in the form of a thread or a band incorporated into documents is known (DE, A1, 390669). In accordance with this method, a clouded coating is created on a polymer film, on which coat, in its turn, slots are created in the form of signs and/or patterns. Painting and/or luminescent matters are applied on at least areas coinciding with that slots, owing to which fact those signs and/or patterns become visible on the cloud coating.

In this method the protective element is created by forming transparent slots on the cloud coating, i.e. into the high-frequency nature of the cloud coating image a more low-frequency image in the form of the transparent area is introduced, which may be filled with painting and/or luminescent matters. Thus, this method does not realized a carrier resolution on the level of cloud layer high-frequency properties.

An apparatus for producing information carriers is known V. P. Veiko. "Laser processing of film systems"). Said apparatus comprises a laser, an optical system forming laser beam, a target converted into the information carrier, and target moving device. With the help of this apparatus the information carrier is provided having maximum resolution of 0.5 $\mu$m while the target being of 60 to 200 nm thick, not permitting to protect completely the information from copying.

An apparatus for producing microfilters, which comprises a heavy ion source, a heavy ion stream forming system, and ionguide, and a polymer film irradiated by the heavy ion stream, is known (SU, A, 574044). Upon etching microholes having a diameter greater than 0.01 $\mu$m are occurred in said film. Such a film, which received the name "nuclear filter" is employed only for matters filtering in various fields, for instance, in medicine, biology.

The basis of the present invention is a task of creating the information film carrier to protect documents and articles from counterfeiting and copying, and also the method and the apparatus for its producing, which would permit to enhance the protection degree of documents and articles through the use of individual peculiarities of apparatus for creating the carrier, the high degree of the uniformity in geometric sizes of marks on the carrier, and the high resolution. Therewith a possibility to employ the proposed method in producing many-number copy carrier volume was taken into account.

Furthermore, the given problem includes a possibility to create on one carrier both visible and concealed images located either on one side of the film carrier or on its both sides while storing the concealed image during several years (i.e. till its visualization).

SUMMARY OF THE INVENTION

The given problem is solved by the fact that the information carrier is a film structure which comprises at least one layer of a polymer material having a relief surface formed by recesses and/or through-holes having the form of solids of revolution.

Recesses, through-holes and areas of a destructured polymer material have a diameter in the range of about 0.001 $\mu$m to 20 $\mu$m on the surface of the polymer material and may have the same diameter and different depth.

At least a portion of recesses and through-holes may be filled with an anisotropic material, and/or a transparent, electrical conductive material, and/or a matter having magnetic properties, and/or a colouring matter, and/or hydrophobic or hydrophilic matter, and/ or luminescent matter, and/or a destructured material or the respective polymer layer.

The carrier layer system may comprise at least one layer of a magnetic material, and/or of a dichroic material, and/or hydrophilic or hydrophobic layer, and/or of a luminescent material, and/or a metal layer partially exceeding the layer of the polymer material and/or a thermoplastic material.

The film structure's layers may be made of polymer materials having different spectral characteristics and refraction coefficients.

The film structure may have on one of its sides a net of a polymer material or a metal having through-hole diameter equal or greater than 20 $\mu$m. Particularly, the net may be produced from the polyethyleneterephthalat.

The given problem is also solved by the fact that in the method for producing an information film carrier in which a step of forming marks on a polymer film having at least one layer is performed, in accordance with the invention the marks are formed by irradiating said polymer film with heavy ions to form a first concealed image, thereafter exposing said film to an ultraviolet radiation to form a second concealed image, and etching said film to create said marks in the form of recesses and holes.

The step of irradiating said polymer film may be performed with space-modulated heavy ions, for example, ions of carbon, chlorine, nitrogen, oxygen, and argon. Therewith the space modulation may be made, particularly, with the help of a mask.

A type of ions and their energy are chosen depending on their ability to pass through the whole width of said polymer film.

In order to enhance carrier protection functions, the step of irradiating with heavy ions is performed in accordance with predetermined angle change between a propagation direction of said heavy ions and a surface of said polymer film. However, as a special case, the angle between said propagation direction of said heavy ions and said film surface may be chosen constant. For the same object—to enhance carrier protection functions—a possibility of irradiating the polymer film from its both sides serves.

Similar to the step of irradiating the polymer film with heavy ions the step of exposing it to the ultraviolet radiation may be performed particularly through a mask.

The step of exposing to the ultraviolet radiation allows to create on the film a concealed image which can be stored for several years till its visualization which is completed by the step of etching the polymer film until appearing through-holes and/or recesses in it.

An apparatus is employed to produce the proposed information carrier which apparatus comprises, arranged in series, a heavy ion source, a heavy ion stream forming system, an ionguide, and a target converted during the step of irradiation with heavy ions into the information carrier, wherein the apparatus further comprises a space amplitude modulation unit arranged in the ionguide downstream from said heavy ion stream forming system and connected to a rotation and/or motion driver, and a target motion unit and a control unit are connected by their corresponding outputs to inputs of the driver and the target motion unit.

Therewith, the unit of the space amplitude modulation of the heavy ion stream is made in the form of a matrix of mobile plates arranged in at least two rows and two columns and connected to the rotation and/or motion driver.

Each of plates may have a possibility to rotate with respect to its own axis of symmetry and to move relative to each other within one row and/or one column by means of the drive. In each matrix row there may be placed of 10 to 100 plates, and in each matrix column there may be of 1 to 10 plates.

Plates are made of a material absorbing said heavy ions partially or completely, and the height of each of said plates is chosen so as to cut off completely said heavy ion stream in the vertical plane. The width of each of said plates is chosen from the range of 0.1 to 100 mm.

BRIEF DESCRIPTION OF THE DRAWINGS

The proposed invention is explained by the drawings in which:

FIG. 6 shows an information carrier used in the form of a film to protect documents and articles from counterfeiting and copying;

FIG. 8 illustrate the step of irradiating the polymer film with heavy ions;

FIG. 9 illustrate the step of exposing the polymer film to the ultraviolet radiation;

FIG. 10 illustrate the step of etching;

FIG. 11 shows the general view of the carrier with marks;

DETAILED DESCRIPTION OF THE PREFERRED EMBODIMENT

The proposed information carrier is a polymer structure made of one or more polymer material layers. The number of polymer structure layers is determined by the information carrier purpose and is selected in accordance with technical and technological factors of mating the carrier with writing and reading devices.

Figure 1:
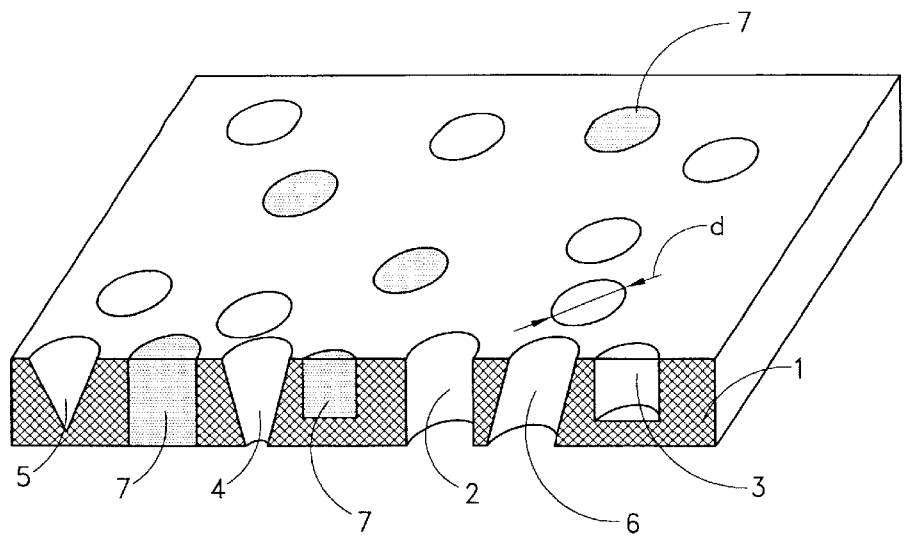
FIG. 1 shows a one-layer information carrier.

Referring to FIG. 1, any one polymer material layer 1 or any their number are performed with through-holes 2 and/or recesses 3 having such their dispersion along the polymer structure surface, which corresponds to the given one.

A polyethyleneterephthalat, copolymer or acrylonitrile, butadiene and styrole, and also dichroic films, for example made from acetylcellulose or sulphate iodquinine, may be used as a polymer material.

Each hole 2 or recess 3 has a diameter d on the surface greater than 0.001 $\mu$m. The diameter value has than 0.001 $\mu$m can be achieved with a great difficulty, and does not allow to provide stable parameters and leads to their essential deviations.

All polymer structure recesses and holes on the respective area have the same diameter d and a form of a symmetric solids of revolution, for example, a cylindrical 2 or a conical 4, 5 form or a form of solids of revolution, which axes are directed at different angles to the carrier surface 6.

The recesses and holes in the carrier may be filled with various materials 7 depending on its specific application and technologies of reading the information from it.

The through-holes allow to perform the transfer of other matters from one layer to another, or from one carrier on another carrier, and the recesses may have different depths and provide a dosed, in accordance with their depths, matter transfer on another carrier.

There exists a number of information transmission condition (valuable paper protection, plastic cards, permits and certificates), when the carrier must comprise the information in a implicit form for an immediate inspection and, in the same time, be operatively readable by special means. All this must combine with an information re-creation difficulty, i.e. a carrier copy re-creation.

Such problems are solved using the proposed carrier when in its holes and/or recesses a destructed material is retained, which is created after irradiating the film.

For the information carrier may be used, for example, as a cryptographic protection, a portion of polymer film holes and/or recesses is filled with the destructed material of the corresponding layer, the information on which is formed by combining the really created holes and/or recesses and those filled with the destructed material. Such carrier provides a complete concealment of information from the immediate observation, and an impossibility of its copying and counterfeiting.

A portion of polymer structure holes may be filled with an anisotropic material. In this case an image reading is executed by phase and polarization techniques.

Five polymer resin main types are used anisotropic materials: polyester, epoxy, phenolic, melamin, silicone or their various combinations, and urethane rubbers.

For the same purposes recesses and holes may be filled with a luminescent matter, for example, comprised a mixture of the zinc sulphide and the manganese. In this case the image reproduction from the carrier is executed with the help of the electric field or an ultraviolet source.

In foregoing versions of filling the carrier recesses and holes with different matters a visualisation of the concealed image is the common point. However, a choice from said versions may be done depending on requirements to an information protection degree and to comfort both of representing and processing an information.

Thus, a carrier having the recess and hole size of 0.001 to 0.01 $\mu$m may be produced by filling them with a destructed material only, and have, or course, a maximum space resolution or record density.

Carriers with recesses and holes carrying anisotropic and dichroic matters have somewhat similar possibilities. While the latter have a greater contrast when reading in the polarized light, the carriers with the anisotropic filling of recesses and holes are represented by a greater selection of said materials. In despite of that the carriers with recesses and holes filled with luminescent matters yield to the carriers described above in the resolution (in this case recesses and holes are made of 1 to 5 $\mu$m in diameter for the luminophor dispersion), a substantial merit of such carrier is a high image contrast owing to a self-luminescence.

The polymer structure may consist of layers in which various materials are utilized.

The layers in the polymer structure are connected one to another or applied one on another by a technique of sprinkling from the solution or melt, and also by a transfer.

Figure 2:
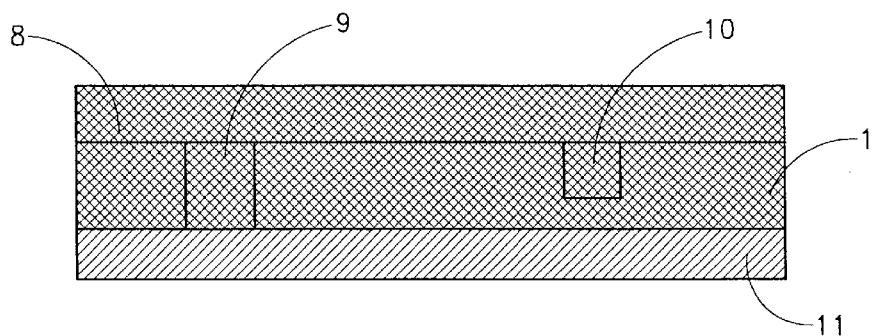
FIG. 2 shows a multilayer information carrier having a metal and thermoplastic layers.

Referring now to FIG. 2, the information carrier with the polymer structure having a layer of a thermoplastic material 8 has an ability to be applied on another carrier, to carry an additional information, allows to erase controllably the written information and may be used to transmit and store the information as plastic cards, protection films for documents.

A thermoplastic layer protecting recesses and holes may be used to fasten this carrier on another carrier, and gives a possibility to modify the written information in the form of free recesses and holes by leaking or pressing a thermoplastic layer 9, 10 into a portion of them. Polyurethane, and copolymers of polystyren, polyvinylchloride, polyvinylbutyral, acrylonitryl, butadiene are used as the thermoplastic material.

A metal layer 11 disposed in the contact with the layer carrying recesses and holes increases substantially the contrast of the image on the carrier. The contrast enhancement is achieved while reading the information due to a double light pass via recesses and holes which diffract partially a directed light stream. The metal layer is applied by an evaporation, or from a chemical solution, or by a galvanic way. The aluminium, the silver, the platinum, the nickel, the chrome, the gold may be used as those metals.

The information carrier has a greater protection and possibilities of utilizing if the information on it may be formed and read on the same area using the different physical effects.

Figure 3:
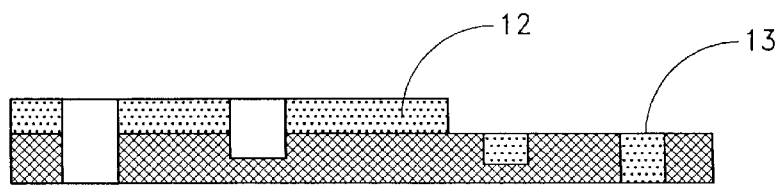
FIG. 3 shows a multilayer information carrier having a magnetic layer.
Figure 4:
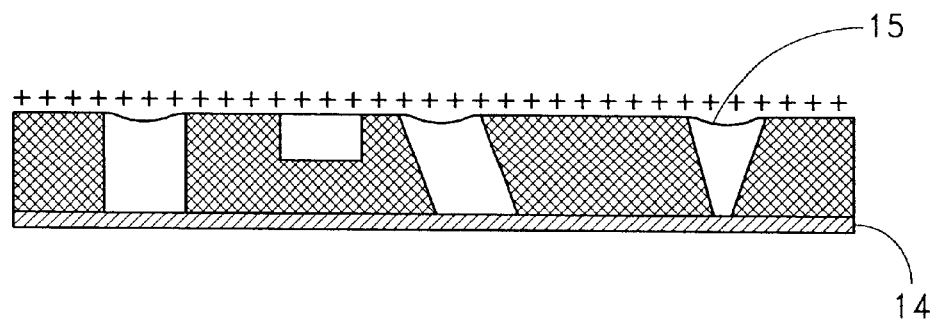
FIG. 4 shows a multilayer information carrier having an electrical conductive material.

In the proposed carrier this is realized by inserting a magnetic layer 12 (FIG. 3), or by filling recesses and/or holes with a magnetic lacquer 13, for example, on the basis of the chrome dioxide. Both in the first and in the second cases the information may be read either by optic or magnetic methods. In the first case, when the magnetic layer fills the whole plane (except of recesses and holes), recesses and holes, along with the magnetic record of the information, play the role of allowing marks read optically. In the second case the carrier comprises a multipoint submicron magnetic record of the information.

A transparent electric conductive layer 14 (FIG. 14) applied on the layer carrying the holes and recesses allows to realize the information carrier in record and display devices. In this case in the information record and display device, charges forming the electrostatic field are applied on the surface of the dielectric film 15 disposed on another side of the layer carrying holes and recesses with respect to the electric conductive layer. Under ponderomotive forces of this field the film is deformed above recesses and holes depending on the charge value, —a microrelief is formed which is read by a phase-contrast optic. Upon removal of the charge the relief is restored under elastic forces of the film. Films of oxides of the tin and indium applied by evaporation are employed as the electric conductive layer.

A multilayer polymer structure in information carriers may comprise layers of polymer material with different refraction coefficients, resulting in that the information carrier acquires an ability, in combination with an existence of recesses and holes in the layers, to be used for reading the information by light-valve systems.

If the information carrier comprises two layers differed one from another by their refraction coefficients wherein one of them comprising the through-holes and recesses turned to another layer, then recesses and holes in such carrier are protected, and the effectiveness of the information reading from them is maintained by the difference of contacting materials refraction indices. As those materials the polystyrene and the gelatine, the plexiglass and the iceland spar having the refracting indices 1.588 and 1.465; 1.491 and 1.658 correspondingly are used.

Layers in the multilayer polymer structure may be formed from polymer materials with different spectral characteristics, for example, materials on the basis of polyvinylchloride paints are used with the next wavelengths: for blue colour—0.45 µm, for green colour—0,52 µm, for red colour—0.63 µm.

The information carrier comprising colour layers with recesses and holes provide a possibility to reproduce the colour information not only by a change of an area occupied with recesses and holes, but also by recesses depth. In this case an additive and substractive reproducing of the colour information is realized. In the simplest case the polystyrene painted by a blue and red due-staff, and films on the basis of polyvinylchloride paints of a red and green colour are used.

A further possibility for creating the range of colours is achieved when filling recesses and holes by a colouring matter.

The information carrier with such polymer structure has multicolour images formed by holes and recesses in different layers of the carrier, and is used, for example, for the high-quality information with protection functions.

The information carrier comprising the polymer substrate with a layer of different depth recesses provide a possibility to transfer the colouring matter on another carrier in a quantity corresponding to recess capacity, i.e. the intaglio printing principle is realized, wherein printing elements being of several microns to micron parts, and the depth may vary from 0 to 5–20 µm.

If one of outside surfaces in the proposed carrier is made hydrophilic or hydrophobic, and its recesses and holes are filled with a hydrophobic or hydrophilic material, then in this case such carrier is an offset printing form with submicron printing or blank elements. The polyethyleneterphthalat serves as a material for such carrier. Recesses and holes are filled with a lacquer to obtain hydrophobic features, and with the starch to obtain hydrophilic features.

The information carrier with layers carrying recesses and holes may be used as a stencil form for transferring the information in the form of a coloured image on another carrier. The polyethleneterephthalat is utilized as the carrier, which is covered with a thin metal layer for enhancing a stability to a great number copying. Inks and pastes are used as colouring matters. Such carrier provide a possibility to reproduce micron and submicron elements of the image.

Figure 5:
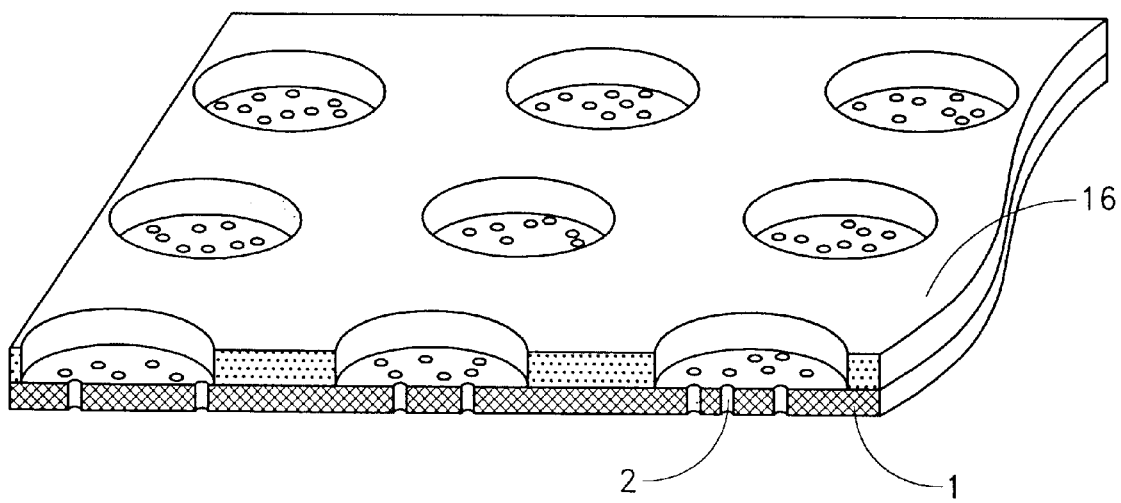
FIG. 5 shows an information carrier having a net coating.

If it is necessary to transfer the information on another carrier by an adhesive, then to prevent an adhesive from getting into the carrier recesses and holes a net 16 (FIG. 5) is placed between the layer carrying these elements and the adhesive, which is made from the polyethyleneterephthalat with a cell equal or greater than 20 µm. Therewith the net with holes less than 20 µm in diameter does not provide the signal-to-noise ratio sufficiency when reading the image from recesses and holes disposed in the net holes.

The information carrier having the net on the polymer basis is intended for transferring the image on another carrier, and is protected from the adhesive getting into the holes and recesses, and is employed in information protective systems from a non-authorized use.

A very important feature of the proposed information carrier is in realizing the condition that all recesses and holes have the same size. Such carrier may be used to protect valuable papers, plastic cards and other documents, and also to produce on their basis guarantee labels for wide purpose products. It is easy to determine under a microscope an existence of recesses and holes of the same size, their location, and with the help of a microscope, a video camera and a computer an identity of the given information to the predetermined one is revealed. At the present time there are no techniques for copying submicron structures, and it is substantially impossible to reproduce submicron holes and/or recesses of the same size on a big enough area.

It is important to not a possibility of creating on the proposed information carrier recesses and holes having different diameter sizes, wherein providing their constancy on individual area. This first relates to the purpose of the carrier and its structure. As pointed above, recesses and holes diameters of 0.001 to 0.01 μm may be realized only in combination with filling these recesses and holes with the destructed material. Information carriers with such range are used for particularly valuable documents with an information protection testing system of the stationary use.

Information carriers with the range of recesses and holes diameter of 0.01 to 0.1 μm are used to encode subscribes on valuable papers, seals and stamps, and also application detachable block-notes with a sheet from the information carrier are produced, which may be applied on various production.

Printing processes (stencil, intaglio and offset printing) using the information carrier in the printed form are performed with carrier layers having recesses and holes of 0.1 to 20 μm in diameter. Such recesses and holes sizes allow to create micro-patterns for a valuable paper protection, and also to print micro-patterns of high quality.

EXAMPLE 1

The Information Carrier as a Material For Document Protection From Copying and Counterfeiting.

Figure 6A:
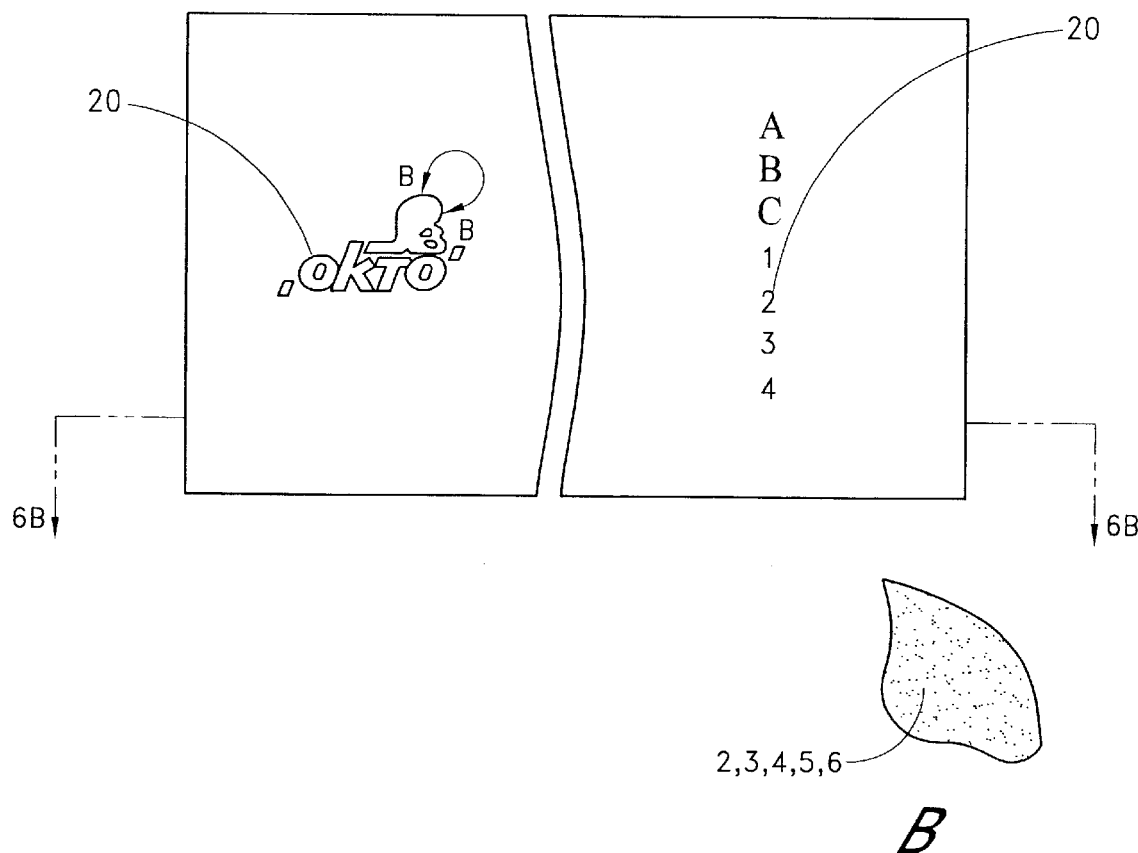
FIG. 6a shows a top view of an information carrier used in the form of a film to protect documents and articles from counterfeiting and copying.
Figure 6B:
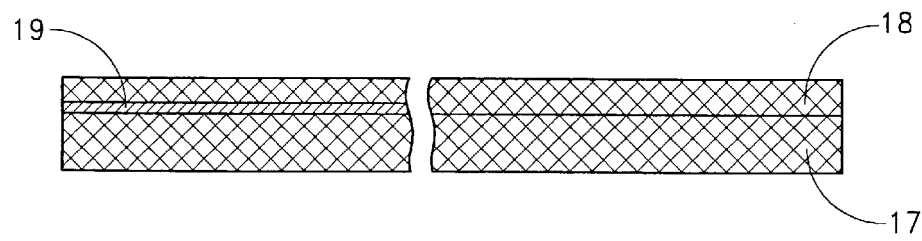
FIG. 6b shows a side, section-view of the information carrier with layers of polyethyleneterephthalat, thermoplastic, and aluminum.

The information carrier is made from the polyethyleneterephthalat film 17 (FIG. 6) 50 μm in thickness with a thermoplastic layer 18 from the polyethylene 10 μm in thickness. The carrier is produced in two versions for working on clearance and for working on reflection. In the second version the carrier comprises an aluminium layer 19 between polymer layers. Recesses and holes 2, 3, 4, 5, and 6 having 1.0 μm in diameter and 10.0 μm in depth (with a deviation not greater than 5%) are made on the polyethyleneterephthalat film. Recesses and holes location density is $10^6$ cm$^-$. A part of the information is written on the carrier in the alphanumeric form and/or in the graphic form 20 observed with the naked eye or with a small magnification.

In order to protect documents the carrier is rolled to the document by the thermoplastic layer.

Recesses and holes of predetermined diameter (1.0 μm) and the density of their location on the carrier surface serve as the protection information on the carrier.

If, while testing, recesses and holes diameters and the density matches with predetermined ones then the document is considered to be authentic. The test is conducted in three stages. In the first stage the integrality of the carrier on the document and the information in the form of the macro-pattern are tested, in the second stage the existence of recesses and holes of 1.0 μm in size and their density are determined under the microscope, and in the third stage the test is performed by the microscope, the video camera, and the computer, as a result receiving the data about recesses and holes size and density, and their matching with those predetermined.

Existing methods and means do not permit to copy the image with such element sizes. It is substantially impossible to counterfeit such carrier since to reproduce the volumetric structure of recesses and holes with the fixed diameter predetermined by an accidental distribution of recesses and holes density is a very complex and expensive problem.

EXAMPLE 2

The Information Carrier is a Plastic Card

Figure 7:
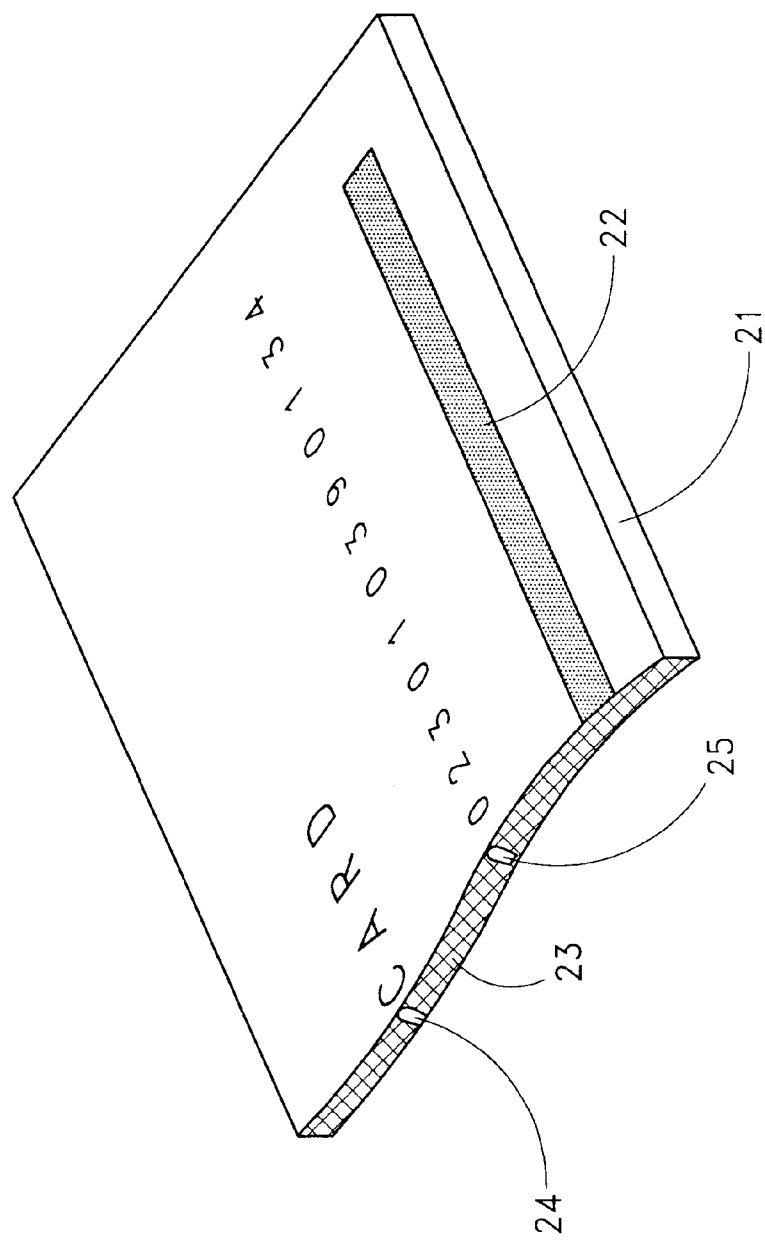
FIG. 7 shows an information carrier used in a plastic card.

On the polymer substrate 21 (FIG. 7) a magnet strip 22 with a metal sublayer 23 of aluminium are applied. The polymer film comprises an image of recesses and holes 0.8 μm in diameter, wherein a portion of the image (the name of the firm producing the card, the firm mark) is formed from the through-holes 24 and another portion (the owner name, the identification cod) is formed from the recesses 25.

When observing the image without special means the areas with the through-holes are indistinguishable. However, when using a microscope together with a directed light source these areas differ sharply in the brightness. The light passing via the through-holes is reflected from the metal sublayer with the greater efficiency than the light reflected from the recesses being a diffuser.

It is substantially impossible to counterfeit or copy such card because it is impossible to repeat the location and sizes of recesses and holes of 0.8 μm in diameter.

The method for producing the information carrier may be realized as follows.

Figure 8A:
FIG. 8a illustrates the step of irradiating the polymer film with heavy ions.
Figure 8B:
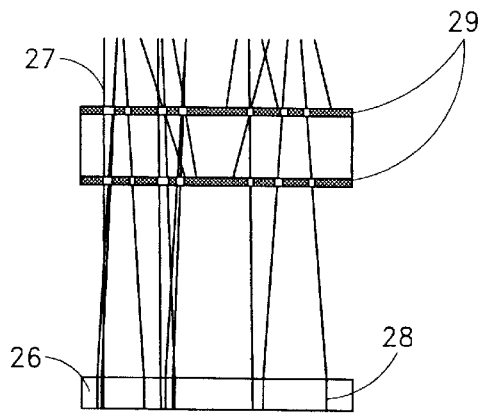
FIG. 8b illustrates irradiating the polymer film through an amplitude space modulation unit.
Figure 8C:
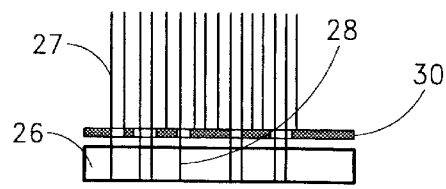
FIG. 8c illustrates irradiating the polymer film through a mask.
Figure 8D:
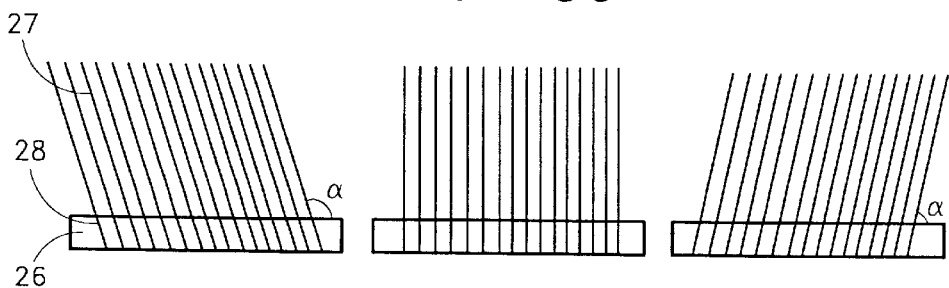
FIG. 8d illustrates irradiating the polymer film with various incident angles.
Figure 8E:
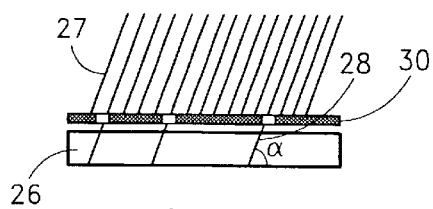
FIG. 8e illustrates irradiating the polymer film through a mask with heavy ions with an angle of incidence less the 90° to the surface of the film.
Figure 9A:
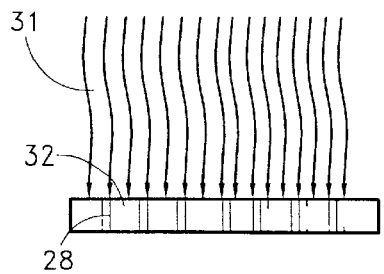
FIG. 9a illustrates the step of exposing the polymer film to ultraviolet radiation.
Figure 9B:
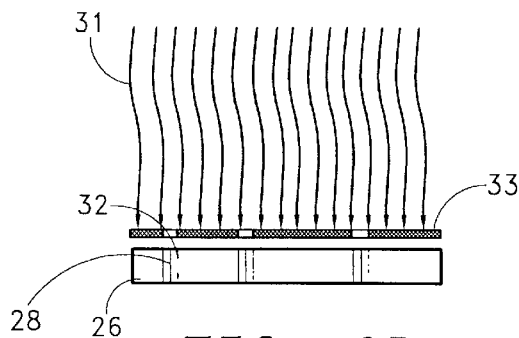
FIG. 9b illustrates exposing the polymer film to ultraviolet radiation through a mask.
Figure 9C:
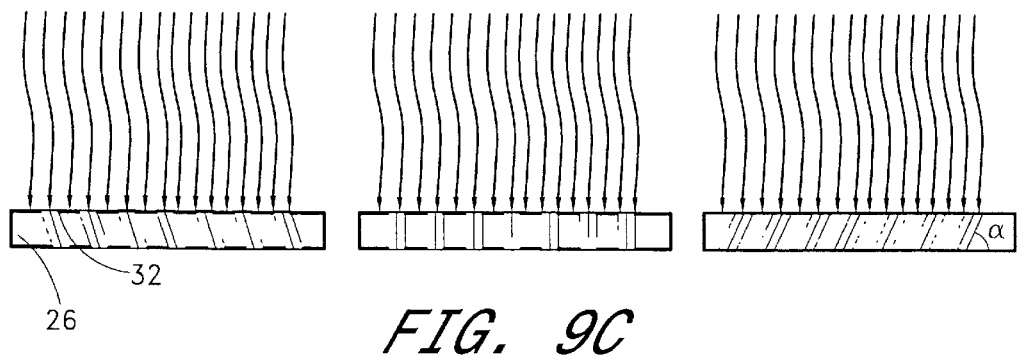
FIG. 9c illustrates exposing a polymer film with heavy ion tracks formed at various angles to ultraviolet radiation.
Figure 9D:
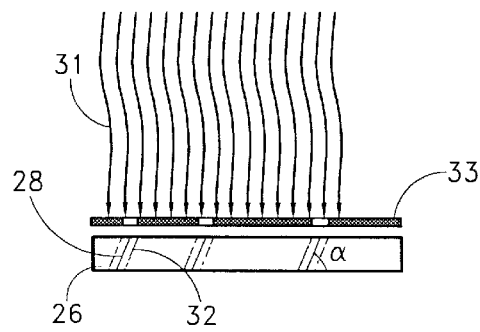
FIG. 9d illustrates exposing a polymer film with heavy ion tracks formed at an angle to ultraviolet radiation through a mask.

A polymer film piece 26 (FIG. 8) is chosen as an initial material for producing the carrier. The polyethyleneterephthalat film may be used as the polymer film. The polymer film is placed into the cyclotron for irradiating by the stream of heavy ions 27 (FIG. 8a). First of all these are ions of the carbon, the oxygen, the nitrogen, the argon, the chlorine. Depending on the film thickness and requirements to the mark recesses and holes depth one or other ion type may be used. Thus, for example, for films with the thickness up to 20 μm substantially any of foregoing ions may be used, since the choice will be defined by the amount of the energy of their acceleration (at the same value, for instance, for the oxygen and argon ions the energy of their acceleration is 32 and 80 megaelectronvolts, respectively), and for films with the greater thickness the choice is limited substantially by the oxygen and argon ions since their run is of 40 to 180 μm.

As a result of the one-sided or two-sided irradiation, track 28 are formed in the film material, which form the first conceal image.

The irradiation may be performed by space-modulated heavy ions for providing the macro-pattern on the carrier. The heavy ion space modulation is achieved by various methods, particularly, by setting an amplitude space modulation unit 29 (FIG. 8b) on the way of the heavy ion stream, and/or, for example, by setting a mask 30 (FIG. 8c) before the polymer film.

Using the amplitude space modulation unit 29 in the cyclotron, the ion irradiation of the whole polymer film surface is performed. In this case areas with the different track intensity or track location frequency are created in the polymer film. While using the mask 30 tracks are created not along the whole surface of the polymer film but only in those places where the film was open to the irradiation.

The heavy ion irradiation may be also performed at an angle α (FIG. 8d) to film surface, being different from the right angle, or at an angle varying in irradiation. As a result, tracks formed in the film are also disposed either at some constant angle α or at an angle varying along the film surface. Therewith the heavy ion stream space modulation may be also used in the manners shown above (FIG. 8e).

Such polymer film production allows to provide a first concealed image that is substantially impossible to reproduce as a result of employing the certain cyclotron and the heavy ion space modulation method.

After the heavy ion irradiation the polymer film is subjected to exposing by the ultraviolet (UV) radiation 31 (FIG. 9). Due to the UV radiation of the polymer film irradiated by heavy ions, extended areas of the destructured material 32

(FIG. 9a) are occurred around tracks formed by heavy ions, which areas are sensible to the following etching. By this way a second concealed image is produced.

The UV radiation exposure as well as the heavy ion irradiation may be performed by the space-modulated UV radiation, particularly by applying a mask 33 (FIG. 9b) on the film surface, wherein open areas correspond to a macro- and micro-pattern of the mark. In order to enhance the carrier protection degree the exposure may be performed from both sides of the polymer film.

It should be noted that in the case when the heavy ion irradiation was made not at the right angle, extended areas of the destructed material are disposed along heavy ion tracks and thus are also disposed at the predetermined angle α (FIGS. 9c and 9d) in the given point of the polymer film.

The visualization of the mark in the form of microholes of 0.001 μm to 20 μm was performed by etching the film, for example, in 20% sodium hydroxide solution. To neutralize the sodium hydroxide the polymer film is then handled with the acetic acid, washing with the distillate water and dried.

Figure 10A:
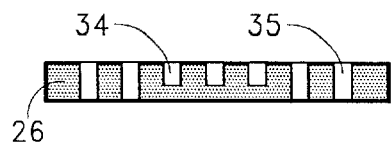
FIG. 10a illustrates the film of FIG. 9a after etching.
Figure 10B:
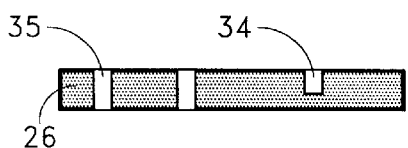
FIG. 10b illustrates the film of FIG. 9b after etching.
Figure 10C:
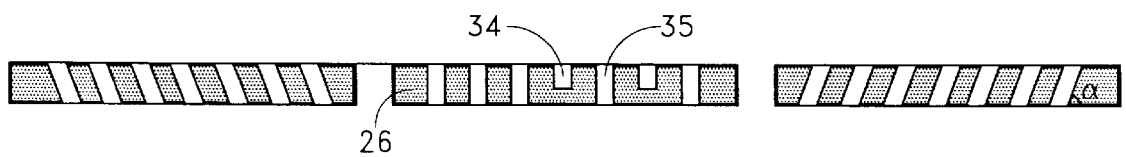
FIG. 10c illustrates the film of FIG. 9c after etching.
Figure 10D:
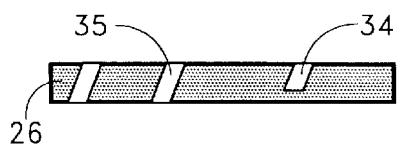
FIG. 10d illustrates the film of FIG. 9d after etching.

As a result, recesses and holes 34 and 35 (FIG. 10a) were formed on the polymer film surface, having the form of solids of revolution. These recesses and holes copies exactly predetermined parameters of the heavy ion space modulation irradiation and UV radiation exposure (FIG. 10b) including the predetermined slope of recesses and holes at the angle α (FIG. 10c and 10d). Thus, the visible macro-pattern (FIG. 11) and the micro-pattern (FIG. 11a) are formed.

Figure 11A:
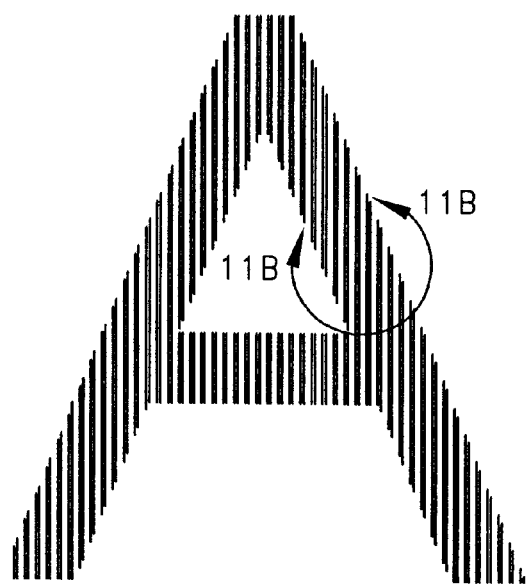
FIG. 11a shows the general view of the carrier with marks.
Figure 11B:
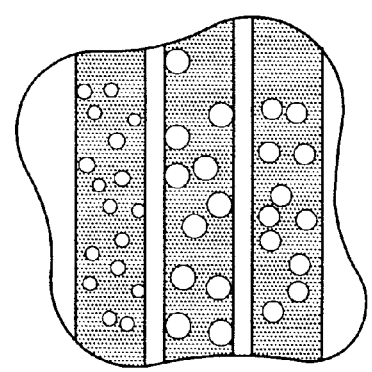
FIG. 11b is a detail view of the carrier with marks.

The macro-pattern may be in the form of various signs, numbers, letters depending on employing masks (FIG. 11a). The micro-pattern (FIG. 11b) is the sets of recesses and holes having a predetermined diameter distribution, a slope to the polymer film surface, and a frequency of the distribution along the surface, for the given carrier.

The provided carrier may be used for the protection of some document, for example, the personality certificate by sticking it on this certificate so as one its part would cover the owner photo not fully and the other its part would fall on the signature place. The owner signature may be covered with a thin layer of the lacquer which would fill free holes on the carrier (other holes are filled with the ink while signing). Taking into consideration the high density of the holes location on the carrier and holes micron sizes, one can assert that it is of no possibility to counterfeit, to correct in the carrier area, or to copy this personality certificate. When viewing he mark image under the microscope, one can see a micro-pattern (with a magnification up to 10 folds) and images of individual holes with the same diameters of 0.01 μm (with a magnification of 1350 folds). For automatic determination of identification features the mark on the carrier is read through the microscope (with a magnification of 40 folds) together with a CCD (charge-coupled device) camera and is input the image into the personal computer. By the latter, sizes of the holes, the density of their distribution and the space frequency spectrum are determined quickly and effectively, allowing to fully reveal and to correlate identification features.

The advantage of the proposed method for producing the information film carrier is that marks are provided in the form of recesses and holes which size range is within 0.01–20 μm in diameter on the carrier surface, and which reproduction with known methods is impossible. Moreover, their space distribution on the film may correspond statistically to radiation apparatus peculiarities, for example, aberrations of the ion beam forming magnetic system, a design of elements and cyclotron materials—the magnet, duants, and other elements. Therefore it is substantially impossible to make the same cyclotron that would give the similar statistic distribution of ions along the polymer film surface.

Among this the use of the cyclotron with heavy ions permits to vary over a wide limits recesses and holes sizes both in their diameter on the film surface and depth within the material, which makes additional possibilities to protect the information with the help of marks because their reproducing by known techniques is improbable.

The important advantage of the method is that the first mark conceal image formed in the film by heavy ions while irradiating it in the cyclotron may be visualized either immediately after irradiating or after the considerable time, till several years, which may be employed for producing the concealed protection.

It should be noted that the heavy ion irradiation brings the possibility to provide marks assembled from recesses and holes with the high degree of the uniformity in geometric sizes. This unique property of the given process allows to protect more firmly the security document from the counterfeiting and corrections.

By exposing with UV radiation, one can introduce changes and additions into marks patterns. And since no visible traces of mark pattern remain on the polymer film after the irradiation, changes and additions during the UV radiation exposure may be brought only knowing exactly the first concealed image location, which is very important during the information multistep protection.

By etching the polymer film with the help of sodium or potassium hydroxide the mark image may be visualized. Therewith depending on etching modes (time, concentration, composition, and temperature of the solution), geometric sizes recesses and holes forming the mark may be varied, but not their co-ordinates.

The selective etching (via the mask) gives additional possibilities to vary the protection by way of marks.

If setting the heavy ion space modulation during the irradiation, which stipulates changes in ion speed and direction, then the possibility to bring an additional protection in the mark in the form of statistically determined dispersion of recesses and holes on the polymer film appears. Since these mark elements have micron sizes, and their surface density is $10^5$–$10^{10}$ elements per 1 $cm^2$, it is extremely difficult to reproduce such mark by other techniques.

Taking into account mark forming technology difficulties, the first step while the attempt of its erasing or copying may be a determination of recesses and holes location topology on the polymer film, which is connected with great expenses of finance and time. The fact is that the conventional microphotograph is not sufficient to describe their location because holes and recesses are disposed within the film volume having an output on its one or both sides. Consequently for the reliable description it is necessary to have a multiple-viewed, steroscopic image. Such challenge relates to sufficiently complicated science-technical problems. However, even after its solution a no less complicated problem arises how to reproduce the mark.

During the exposure by the space-modulated UV radiation, a possibility to transform the first concealed image into the second concealed image of the mark appears, with simultaneous incorporating additions and changes in it which were inexpedient for some reasons to perform in the stage of forming the first concealed image. For instance, it is more expedient to modulate the high-frequency component of the mark macro-pattern in the stage of exposing by UV than in the stage of irradiating.

During the irradiation, in order to enlarge carrier use possibilities, the mark macro-pattern may be created which is assembled from micro-patterns in the form of micro-holes and micro-recesses. For this purpose the irradiation is conducted through the mask forming the image. Marks with the macro-pattern (their reading is performed without employing special means), with the micro-pattern (a small optic magnification is needed while reading), and with the submicron-pattern (in this case the optic or combined —optic and electronic—magnification of 1000–1500 folds is employed while reading) may be provided with the help of the mask.

In many cases it is required the information carrier to protect articles and documents, working on clearance, for example, in plastic cards with holes, in some types of passes, certificates and tickers. In some applications the carrier is applied onto the mirror reflected surface and works actually on clearance. The most effective carrier is one working on clearance if its marks are performed from holes because the reading light beam passing through those holes would not diffuse in the carrier material, which takes place when marks are performed from recesses.

The significant advantage of the proposed method over known ones is a possibility to form marks from recesses and holes located at the predetermined angle to the film surface, which is achieved by irradiating it by heavy ions with the predetermined angle change between the heavy ion spread direction and the film surface, particularly, this angle may be chose constant.

The variation of the angle value of the orientation of mark holes and recesses relatively to the film surface gives the enhancement to carrier protection functions due to substantially complete absence of possibilities to perform this by other methods.

Figure 12:
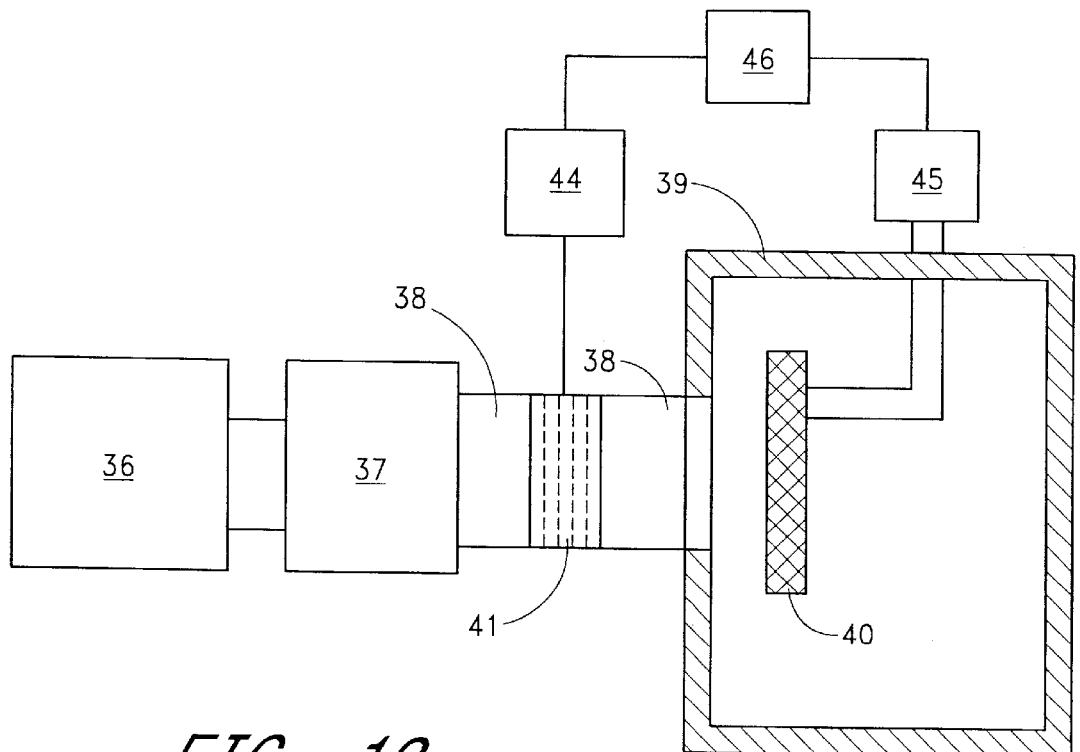
FIG. 12 shows diagrammatically the apparatus for producing information carriers.

The apparatus for producing information carriers comprises a heavy ion source 36 (FIG. 12), a heavy ion stream forming system 37 arranged in the direction of the heavy ion stream, and a ionguide 38 coupled to an inlet of a camera 39.

A target 40 converted into the information carrier while irradiating is placed in the camera 39 and located so as the heavy ion stream is directed on it.

Figure 13:
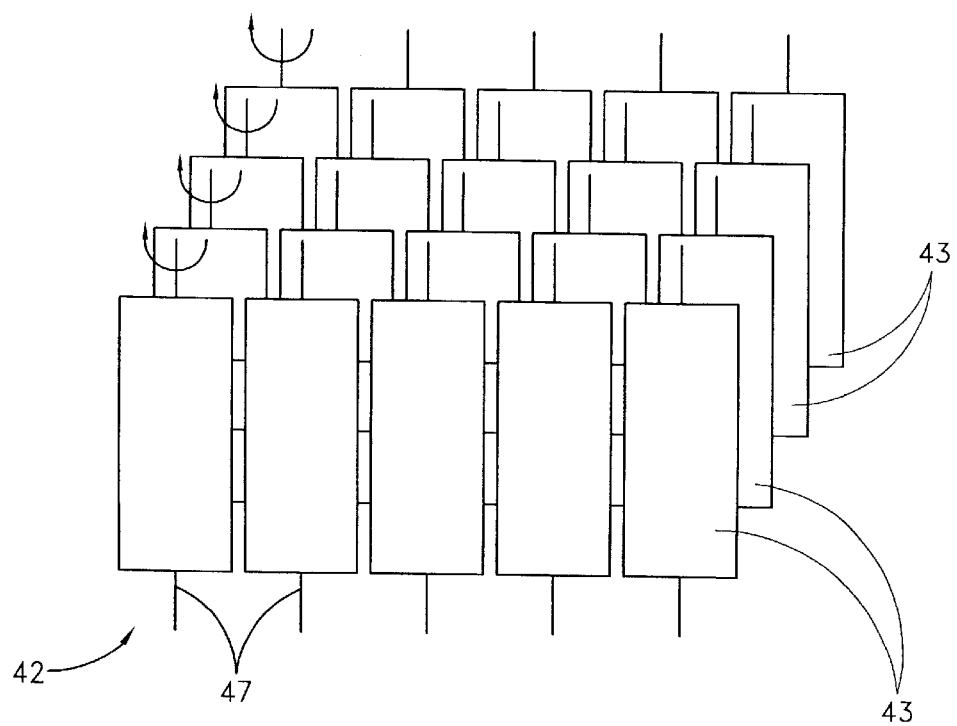
FIG. 13 is the general view of the plate matrix.

In the ionguide 38, following the system 37, a heavy ion stream space amplitude modulation unit 41 is arranged being a matrix 42 (FIG. 13) of plates 43. The matrix 42 has several rows and several columns of plates 43. In each row of the matrix 42 there are disposed of 10 to 100 plates, wherein if the number of plates is less then 10 then a dynamic range of an accidental field record falls sharply, and with the number of plates in the row exceeding 100 a possibility of ionguide aperture effective use is limited.

In each columns of the matrix 42 there are disposed of 1 to 10 plates, wherein if there number is greater than 10 then a possibility of an ionguide apeture effective use is limited.

Each plate 43 of the matrix 42 is made from a material absorbing heavy ions, partly or completely, for example, from the beryllium bronze.

A height of the plate 43 is selected so that it would cut off completely the heavy ion stream in the vertical plane, if there is only one column in the matrix 42. If the matrix 42 has several columns then this requirement is presented to a total height value of column plates 43, respectively.

A plate width is selected from the range of 1.0 mm to 100 mm, wherein at the width of less than 1.0 mm it is difficult in technical way to provide their effective control-setting and such complication is unjustified for the carrier production, and at the width of greater than 100 mm the ion stream modulation becomes ineffective.

To provide a possibility of adjusting the unit 41, plates 43 in the matrix 42 are made with a possibility to rotate with respect to its own axis of symmetry and/or to move relative to each other within one row and/or one column. For this purpose the apparatus comprises a plate rotating and/or moving unit 44 coupled with the unit 41.

The unit 44 is a remote driver, for example, on the basis of selsyns and may be performed by any known way.

In the disclosed apparatus the target 40 is moved within the camera 39 by the driver 45 which is connected to an apparatus operation control unit 46. The unit 44 is also connected to the unit 46.

The driver 45 as well as the unit 46 are performed by any known way depending on the type of the produced information carrier, its design and purpose.

The system 37 is a magnet optic structure of a known design.

The apparatus for producing information carriers operates as follows.

In the unit 41 by means of the unit 44 the relative position of plates 43 in the matrix 42 is set by moving them along rows and columns of the matrix 42 and rotating with respect to their own axis of symmetry 47 so as to provide the passing of the heavy ion stream which form the predetermined distribution of track from the ion passing. Plates 43 in the matrix 42 move in three directions and, moreover, rotate at required angle, allowing to provide the space amplitude modulation of the ion stream directed to the unit 41.

The heavy ion stream is directed from the source 36 into the system 37 where the stream is formed by the following parameter: the distribution of pores along the surface of the target 40 within the range of $5 \cdot 10^5$ to $10^{10}$ cm$^{-2}$.

The formed stream is directed through the ionguide 38 to the unit 41 in which the stream space amplitude modulation take place due to the partial or full absorption of heavy ion stream parts in the material of plates 43.

Then the heavy ion stream penetrates through the inlet into the camera 39 onto the surface of the target 40 which polymer structure is subjected to the heavy ion irradiation and converted into the information carrier.

The proposed apparatus provides the production of the carrier with a wide dynamic range of both the ion surface density change and the distribution of this density along the target surface.

INDUSTRIAL APPLICABILITY

The present invention may be used for producing the following papers and other documents assumed to be protected by the proposed submicron protection method: banknotes, passports, bonds, shares, bills, checks, plastic cards, certificates, passes, tickets, bank documents, notarial documents, diplomata, certification and licence cards, labels, lottery tickets, telephone cards etc.

Furthermore, the proposed film carrier may be fixed on various articles by any known technique suitable for polymer films to confirm their authenticity. For instance, it may be a preliminary recorded audio or video cassette with the film stuck on its packaging.

What is claimed is:

1. An information carrier being a film structure comprising at least one layer of a polymer material having a relief surface, wherein the relief surface is formed by at least one of recesses and through-holes having a form of solids of revolution and wherein the film structure comprises several layers made of polymer materials having different spectral characteristics.

2. The carrier defined by claim 1, wherein said recesses, said through-holes and areas of a destructed polymer material have a diameter on the surface of the polymer material in the range of about 0.001 micrometers to 20 micrometers.

3. The carrier defined by claim 1, wherein said recesses and through-holes have the same diameter.

4. The carrier defined by claim 1, wherein said recesses and through-holes have different depths.

5. The carrier defined by claim 1, wherein at least a portion of said recesses and through-holes are filled with an anisotropic material.

6. The carrier defined by claim 1, wherein at least a portion of said recesses and through-holes are filled with a transparent, electrically conductive material.

7. The carrier defined by claim 1, wherein at least a portion of said recesses and through-holes are filled with a matter having magnetic properties.

8. The carrier defined by claim 1, wherein at least a portion of said recesses and through-holes are filled with a colouring matter.

9. The carrier defined by claim 1, wherein at least a portion of said recesses and through-holes are filled with a hydrophobic matter.

10. The carrier defined by claim 1, wherein at least a portion of said recesses and through-holes are filled with a luminscent matter.

11. The carrier defined by claim 1, wherein at least a portion of said recesses and through-holes are filled with a destructed material of the polymer layer.

12. The carrier defined by claim 1, wherein said film structure comprises at least one layer of a magnetic material.

13. The carrier defined by claim 1, wherein said film structure comprises at least one layer of a dichroic material.

14. The carrier defined by claim 1, wherein said film structure comprises at least one hydrophilic or hydrophobic layer.

15. The carrier defined by claim 1, wherein said film structure comprises at least one layer of a luminescent material.

16. The carrier defined by claim 1, wherein said film structure comprises at least one metal layer partially covering said layer of the polymer material.

17. The carrier defined by claim 1, wherein at least one layer of said film structure is made of a thermoplastic material.

18. The carrier defined by claim 1, wherein the film structure comprises several layers made of polymer materials having different refraction coefficients.

19. The carrier defined by claim 1, wherein said film structure has on one side a net of a polymer material having a through-hole diameter at least 20 micrometers.

20. The carrier defined by claim 19, wherein a polyethyleneterphthalat is employed as the net polymer material.

21. A method for producing an information film carrier to protect articles and documents from counterfeiting and copying, said method comprising a step of forming marks on a polymer film having at least one layer, wherein said marks are formed by irradiating said polymer film with heavy ions to form a first concealed image, thereafter exposing said film to an ultraviolet radiation to form a second concealed image, and etching said film to create said marks in the form of recesses and holes.

22. The method of claim 21, wherein said step of irradiating said polymer film is performed with space-modulated heavy ions.

23. The method of claim 22, wherein said step of irradiating said film with heavy ions is performed through a mask applied to the film.

24. The method of claim 21, wherein said heavy ions are selected from the group comprising chlorine, nitrogen, oxygen, argon, and carbon ions.

25. The method of claim 21, wherein said ions and their energy are chosen depending on their ability to pass through the whole thickness of said polymer film.

26. The method of claim 21, wherein said step of irradiating with heavy ions is performed in accordance with predetermined angle change between a propagation direction of said heavy ions and a surface of said polymer film.

27. The method of claim 26, wherein said angle between said propagation direction of said heavy ions and said film surface is constant.

28. The method of claim 21, wherein said step of irradiating with heavy ions is performed from both film sides.

29. The method of claim 21, wherein said step of exposing said polymer film is performed with space-modulated ultraviolet radiation.

30. The method of claim 29, wherein step of exposing said film with said ultraviolet radiation is performed through a mask.

31. The method of claim 21, wherein said step of etching said film is performed until through-holes appear in said film.

32. The method of claim 21, wherein said step of etching said film is performed through a mask applied to the film.

33. The method of claim 21, wherein said step of etching said film is performed separately from both sides of the film.

34. An apparatus for producing information carriers, said apparatus comprising:
   a heavy ion source,
   a heavy ion stream forming system,
   an ionguide,
   a target converted during a step of irradiation with said heavy ions into said information carrier,
   a space amplitude modulation unit arranged in said ionguide downstream from said heavy ion stream forming system and connected to a rotation and motion driver,
   a motion unit of said target, and
   a control unit which is connected by corresponding outputs to inputs of said rotation and motion driver and said target motion unit.

35. The apparatus by claim 34, wherein said unit of the space amplitude modulation of said heavy ion stream is made in the form of a matrix of mobile plates arranged in at least two rows and two columns.

36. The apparatus of claim 35, wherein each mobile plate is rotatable about an axis of symmetry mobile plate is rotatable about an axis of symmetry of each mobile plate.

37. The apparatus of claim 36, wherein each of said plates are movable with respect to other plates within at least one row and one column.

38. The apparatus of claim 35, wherein each of said matrix rows comprises of 10 to 100 said plates.

39. The apparatus by claim 35, wherein each of said matrix columns comprises of 1 to 10 said plates.

40. The apparatus of claim 35, wherein each of said plates is made of a material which at least partially absorbs said heavy ions.

41. The apparatus of claim 35, wherein a height of each of said plates is chosen so as to be larger than the dimension of the cross-section of said heavy ion stream.

42. The apparatus of claim 35, wherein a width of each of said plates is of approximately 1.0 mm to 100 mm.

43. The carrier defined by claim 1, wherein at least a portion of said recesses and through-holes are filled with a hydrophilic matter.

44. The carrier defined by claim 1, wherein said film structure has on one side a net of a metal having through-hole diameter at least 20 micrometers.

45. An information carrier being a film structure comprising at least one layer of a polymer material having a relief surface, wherein the relief surface is formed by at least one of recesses and through-holes having a form of solids of revolution and wherein the film structure comprises several layers made of polymer materials having different refraction coefficients.

46. The carrier defined by claim 45, wherein the recesses, the through-holes and areas of a destructed polymer material have a diameter on the surface of the polymer material in the range of about 0.001 micrometers to 20 micrometers.

47. The carrier defined by claim 45, wherein the recesses and through-holes have the same diameter.

48. The carrier defined by claim 45, wherein the recesses and through-holes have different depths.

49. The carrier defined by claim 45, wherein at least a portion of the recesses and through-holes are filled with an anisotropic material.

50. The carrier defined by claim 45, wherein at least a portion of the recesses and through-holes are filled with a transparent, electrically conductive material.

51. The carrier defined by claim 45, wherein at least a portion of the recesses and through-holes are filled with a matter having magnetic properties.

52. The carrier defined by claim 45, wherein at least a portion of the recesses and through-holes are filled with a coloring matter.

53. The carrier defined by claim 45, wherein at least a portion of the recesses and through-holes are filled with a hydrophobic matter.

54. The carrier defined by claim 45, wherein at least a portion of the recesses and through-holes are filled with a luminescent matter.

55. The carrier defined by claim 45, wherein at least a portion of the recesses and through-holes are filled with a destructed material of the polymer layer.

56. The carrier defined by claim 45, wherein the film structure comprises at least one layer of a magnetic material.

57. The carrier defined by claim 45, wherein the film structure comprises at least one layer of a dichroic material.

58. The carrier defined by claim 45, wherein the film structure comprises at least one hydrophilic or hydrophobic layer.

59. The carrier defined by claim 45, wherein the film structure comprises at least one layer of a luminescent material.

60. The carrier defined by claim 45, wherein the film structure comprises at least one metal layer partially covering the layer of the polymer material.

61. The carrier defined by claim 45, wherein at least one layer of the film structure is made of a thermoplastic material.

62. The carrier defined by claim 45, wherein the film structure comprises several layers made of polymer materials having different spectral characteristics.

63. The carrier defined by claim 45, wherein the film structure has on one said a net of polymer material having a through-hole diameter at least 20 micrometers.

64. The carrier defined by claim 63, wherein a polyethyleneterphthalat is employed as the net polymer material.

65. The carrier defined by claim 45, wherein at least a portion of the recesses and through-holes are filled with hydrophilic matter.

66. The carrier defined by claim 45, wherein the film structure has on one side a net of metal having through-hole diameter at least 20 micrometers.

\* \* \* \* \*